United States Patent
Hodgson et al.

(10) Patent No.: US 9,556,774 B2
(45) Date of Patent: Jan. 31, 2017

(54) CONVEYING UNIT FOR A LIQUID ADDITIVE FOR EXHAUST GAS AFTER-TREATMENT, TANK FOR STORING LIQUID ADDITIVE, MOTOR VEHICLE HAVING THE CONVEYING UNIT AND METHOD FOR DETERMINING A LIQUID ADDITIVE QUANTITY IN A TANK

(71) Applicant: EMITEC GESELLSCHAFT FUER EMISSIONSTECHNOLOGIE MBH, Lohmar (DE)

(72) Inventors: Jan Hodgson, Troisdorf (DE); Joerg-Roman Konieczny, Much (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/474,469

(22) Filed: Sep. 2, 2014

(65) Prior Publication Data

US 2014/0366512 A1 Dec. 18, 2014

Related U.S. Application Data

(63) Continuation of application No. PCT/EP2013/053838, filed on Feb. 26, 2013.

(30) Foreign Application Priority Data

Mar. 2, 2012 (DE) .......... 10 2012 004 269

(51) Int. Cl.
  *F01N 11/00* (2006.01)
  *F01N 3/20* (2006.01)

(52) U.S. Cl.
  CPC ............. *F01N 3/208* (2013.01); *F01N 3/2066* (2013.01); *F01N 11/00* (2013.01);
  (Continued)

(58) Field of Classification Search
  CPC .................. G01N 25/18; G01N 29/024; F01N 2900/1818
  See application file for complete search history.

(56) References Cited

U.S. PATENT DOCUMENTS

| 8,429,900 B2 | 4/2013 | Knetsch et al. |
| 2012/0006003 A1* | 1/2012 | Darr .......... F01N 3/208 60/274 |

(Continued)

FOREIGN PATENT DOCUMENTS

| DE | 19842484 A1 | 12/1999 |
| DE | 10319151 A1 | 11/2004 |

(Continued)

OTHER PUBLICATIONS

Machine translation of JP 2010-159641 A, accessed on Sep. 16, 2015.*

*Primary Examiner* — Jonathan Matthias
(74) *Attorney, Agent, or Firm* — Laurence A. Greenberg; Werner H. Stemer; Ralph E. Locher

(57) ABSTRACT

A conveying unit which can be mounted in a tank for conveying a liquid additive from the tank includes a filling level sensor which can emit and receive waves that are reflected back to the filling level sensor at a surface of liquid in the tank, so that a filling level measurement can be carried out by measuring the transit time of the waves. The conveying unit has at least one additional sensor device or sensor with which it is possible to determine if there is frozen additive in the tank. A tank for storing a liquid additive, a motor vehicle having the conveying unit and a method for determining a liquid additive quantity in a tank are also provided.

12 Claims, 3 Drawing Sheets

(52) U.S. Cl.
CPC ...... *F01N 2610/01* (2013.01); *F01N 2610/02* (2013.01); *F01N 2610/142* (2013.01); *F01N 2610/1406* (2013.01); *F01N 2610/148* (2013.01); *F01N 2900/1814* (2013.01); *Y02T 10/24* (2013.01); *Y10T 137/0324* (2015.04); *Y10T 137/7297* (2015.04)

(56) References Cited

U.S. PATENT DOCUMENTS

| | | | |
|---|---|---|---|
| 2012/0118059 A1* | 5/2012 | Reimer | F01N 3/2066 73/290 V |
| 2012/0225396 A1 | 9/2012 | Harr et al. | |
| 2012/0311999 A1 | 12/2012 | Hodgson et al. | |
| 2013/0074590 A1 | 3/2013 | Bertow et al. | |
| 2013/0160433 A1 | 6/2013 | Schepers et al. | |

FOREIGN PATENT DOCUMENTS

| | | |
|---|---|---|
| DE | 102007016858 A1 | 10/2008 |
| DE | 102009041938 A1 | 3/2011 |
| DE | 102009055716 A1 | 6/2011 |
| DE | 102010035008 A1 | 2/2012 |
| EP | 1473447 A1 | 11/2004 |
| EP | 2341224 A1 | 7/2011 |
| JP | 2010159641 A * | 7/2010 |
| WO | 2008122460 A1 | 10/2008 |
| WO | 2011064050 A1 | 6/2011 |
| WO | 2011064266 A1 | 6/2011 |
| WO | 2011085830 A1 | 7/2011 |

\* cited by examiner

CONVEYING UNIT FOR A LIQUID ADDITIVE FOR EXHAUST GAS AFTER-TREATMENT, TANK FOR STORING LIQUID ADDITIVE, MOTOR VEHICLE HAVING THE CONVEYING UNIT AND METHOD FOR DETERMINING A LIQUID ADDITIVE QUANTITY IN A TANK

CROSS-REFERENCE TO RELATED APPLICATION

This is a continuation, under 35 U.S.C. §120, of copending International Application No. PCT/EP2013/053838, filed Feb. 26, 2013, which designated the United States; this application also claims the priority, under 35 U.S.C. §119, of German Patent Application DE 10 2012 004 269.8, filed Mar. 2, 2012; the prior applications are herewith incorporated by reference in their entirety.

BACKGROUND OF THE INVENTION

Field of the Invention

The invention relates to a conveying unit for conveying a liquid additive from a tank. The conveying unit can be used, in particular, to convey a liquid additive into an exhaust gas treatment device of an internal combustion engine. Exhaust gas treatment devices in which exhaust gas purification methods are carried out, during which a liquid additive (oxidizing agents such as fuel and/or reducing agent) is fed to the exhaust gas, are widespread, in particular in the field of motor vehicles. The invention also relates to a tank for storing a liquid additive, a motor vehicle having the conveying unit and a method for determining a liquid additive quantity in a tank.

A method which is used widely is the method of selective catalytic reduction (SCR) in which nitrogen oxide compounds in the exhaust gas are reduced by using a reducing agent. Ammonia is typically used as the reducing agent. Ammonia is normally not stored directly itself in motor vehicles but instead in the form of a liquid reducing agent precursor solution which can be converted into ammonia externally with respect to the exhaust gas in a reactor which is provided for that purpose and/or within the exhaust gas stream in the exhaust gas treatment device. The reducing agent precursor solution is then the liquid additive. A frequently used reducing agent precursor solution is aqueous urea solution which can be obtained with a urea content of 32.5% under the trademark AdBlue®. The terms reducing agent and reducing agent precursor solution are used as synonyms for one another below and are covered by the term "additive."

Normally, additional or separate tanks are provided in motor vehicles in order to store liquid additives. A separate conveying unit is provided to transport the liquid reducing agent from the tanks to an exhaust gas treatment device. Conveying units which are also installed directly in the tank for the liquid additive are desired. Such conveying units have a particularly cost-effective and expedient construction because additional lines and/or pipes for drawing the liquid additive from the tank can be avoided. Such a conveying unit is known, for example, from International Publication No. WO 2011/085830 A1, corresponding to U.S. Patent Application Publication No. 2012/0311999.

Furthermore, it is advantageous if such a conveying unit is let into a tank bottom. Moreover, it is often desired that such a conveying unit is also equipped with a filling level sensor with which a filling level of liquid additive in the tank can be determined or monitored. It is problematic in that case to provide one version of the conveying unit that is to be used for various tanks. Different tanks are frequently necessary for different applications (for example for different motor vehicle models) because the necessary quantity of liquid additive is different for different applications and/or because the available installation space for the tank is different. Therefore, it would be desirable if a (single) configuration of the conveying unit could be used for various constructions of tanks. The conveying unit with a filling level sensor should therefore be configured in such a way that it can detect the filling level in the tank independently of the size and, in particular, of the structural height of the tank.

A further difficulty when configuring conveying units for liquid additive is that liquid (aqueous) additives which are typically used in motor vehicles can freeze at low temperatures. The liquid additive AdBlue® described above freezes, for example, at temperatures of approximately −11° C. Such low temperatures can occur in the field of motor vehicles, in particular during relatively long deactivated times of the motor vehicle (especially in the winter). A conveying unit should therefore be configured in such a way that, on one hand, it withstands the pressure of ice occurring as a result of the freezing of the reducing agent and the associated expansion in volume of the additive. On the other hand, the conveying unit should also be able to detect if there is ice in the tank because if so it is often impossible to convey liquid additive out of the tank.

SUMMARY OF THE INVENTION

It is accordingly an object of the invention to provide a conveying unit for a liquid additive for exhaust gas after-treatment, a tank for storing a liquid additive, a motor vehicle having the conveying unit and a method for determining a liquid additive quantity in a tank, which overcome the hereinafore-mentioned disadvantages and alleviate or even solve the highlighted technical problems of the heretofore-known units, tanks, vehicles and methods of this general type. The intention is, in particular, to specify a conveying unit for conveying a liquid additive which is especially advantageous compared to the prior art and which is improved, in particular, in terms of the determination of the filling level and of safe operation. Furthermore, the intention is to describe a particularly advantageous method for determining a filling quantity of liquid additive in a tank which is adapted, in particular, to the situation of the freezing/thawing of the liquid additive.

With the foregoing and other objects in view there is provided, in accordance with the invention, a conveying unit which can be mounted in a tank for conveying a liquid additive from the tank. The conveying unit comprises a filling level sensor which can emit and receive waves that are reflected back to the filling level sensor at a surface of liquid in the tank so that a filling level measurement can be carried out by measuring the transit time of the waves, and at least one additional sensor with which it is possible to determine if there is frozen additive in the tank.

By using the measurement of the transit time it is possible to carry out particularly precise determination of a distance from a surface of liquid and back and therefore particularly precise determination of a filling level in a tank with a liquid additive if the propagation speed of the waves in the liquid additive is known. The propagation speed can be determined, for example, by using a measurement. The propagation speed can also be made available as a value which is stored in an electronic memory.

The conveying unit is preferably mounted in an opening in a tank bottom of the tank. The conveying unit extends preferably from the tank bottom into an interior space of the tank. The opening at the tank bottom preferably has a flange into which the conveying unit is inserted and against which the conveying unit can be disposed in a fluid tight fashion so that liquid additive cannot escape from the tank. An intake point, at which the conveying unit can draw liquid additive from the tank, is preferably provided on the conveying unit. The conveying unit preferably additionally has an output point at which liquid additive can be output (outside the tank) and from where it can pass to an exhaust gas treatment device and/or a consumer/conditioner. The output point is generally embodied as a (standardized) port to which a conveying line for the liquid additive can be connected.

The conveying unit preferably includes a housing at which the intake point is disposed. In this case the housing practically divides an interior space of the tank and an interior space of the conveying unit from one another with the result that the housing is free of additive on the inside (with the exception of the lines provided for this purpose). Functional components with which the conveying unit feeds or treats the liquid additive are disposed in the housing. Such components can, for example, be at least one pump, at least one valve and/or at least one filter. If appropriate, components with which the conveying of liquid additive and/or other parameters of the conveying unit can be monitored are also disposed in the housing. Such components can, for example, be at least one temperature sensor or at least one pressure sensor.

The filling level sensor is preferably configured on the conveying unit in such a way that in a typical installation orientation of the conveying unit in a tank for liquid additive the filling level sensor is oriented upward (parallel to gravity) and configured to emit waves (optical, acoustic, electromagnetic waves) onto a surface of the liquid in a direction which is parallel to gravity. A particularly precise measurement of the transit time for waves to the surface of the liquid and back is then possible. It is, in particular, not necessary to allow for a relatively long transit time which occurs because the waves strike the surface of the liquid at an angle. Furthermore, it is ensured that a large proportion of the waves at the surface of the liquid are reflected back again to the filling level sensor in parallel.

The waves are preferably emitted by the filling level sensor into a radiation region (if appropriate a partially separated radiation region). The radiation region is a conical region which extends from the filling level sensor and has an angle of aperture of, for example, less than 20° [degrees], preferably between 1° and 10°. The axis of this cone preferably corresponds to the vertical direction from the filling level sensor to the surface of the liquid. The filling level sensor is configured to register surfaces or objects which lie in this irradiation region.

At least one reference mark, which extends into the radiation region, is preferably also provided on the conveying unit or on a housing of the conveying unit. A portion of the radiated waves is also reflected back to the filling level sensor at this reference mark. It is therefore also possible for the transit time of waves to the reference mark and back to the filling level sensor to be measured. The distance from the filling level sensor to the reference mark is preferably known precisely. Through the use of the measurement of the transit time to the reference mark and back it is then possible to determine the propagation speed of the waves in the liquid additive. The propagation speed which is determined in this way can be used to calculate the filling level from the transit time to the surface of the liquid. It is therefore possible to detect cross-influences on the propagation speed due to changes in properties of the liquid additive and to minimize them. Such cross-influences are, for example, the temperature of the liquid additive and/or the composition of the liquid additive. If the liquid additive is an aqueous urea solution, the speed of the wave signal differs, for example, as a function of the concentration of the urea.

It has become apparent that, in particular, if liquid additive is present in a frozen state in the tank, a filling level sensor which irradiates waves for measuring the filling level will pass on incorrect measurement signals. This can be partially due to the fact that the transit times of waves and, in particular, of ultrasonic waves in the liquid additive and in the frozen additive or in ice are very different. In addition, reflections of waves take place at the boundary faces (also located in the interior of the tank) between the frozen additive and the liquid additive, which reflections can have the effect that the surface of the liquid is not sensed by the filling level sensor at all but instead the transit time to a randomly disposed ice surface inside the additive is measured. For this reason, it has proven advantageous to provide, in addition to the filling level sensor, a (further) sensor device or sensor at the conveying unit which monitors (preferably in a binary fashion) whether or not there is frozen additive in the tank. The term "binary" monitoring means, in particular, that this additional sensor device preferably detects only two different states, specifically whether or not there is frozen liquid additive. The filling level information determined by the filling level sensor can be evaluated much more precisely and much more reliably by such an additional sensor device.

In accordance with another advantageous feature of the conveying unit of the invention, the filling level sensor is an ultrasonic sensor.

An ultrasonic sensor transmits and receives ultrasonic waves. The term ultrasonic waves typically refers to sound waves in a frequency range of more than 16 kHz. An ultrasonic sensor is particularly preferably used, which emits ultrasonic waves in a frequency range between 20 kHz and 20 MHz. It has been proven that with such an ultrasonic sensor particularly precise measurement of a transit time can be carried out (in particular if the liquid additive is a reducing agent and particularly preferably an aqueous urea solution).

In accordance with a further advantageous feature of the conveying unit of the invention, the conveying unit can be mounted on the tank bottom of the tank, and the additional sensor device is disposed further away from the tank bottom than the filling level sensor.

The filling level sensor should be disposed on the conveying unit as far as possible in such a way that it is positioned as close as possible to the tank bottom. This is advantageous because in this way even a particularly low filling level in the tank can still be reliably detected. The filling level sensor can generally monitor only the filling level of the liquid additive in the tank if the liquid additive is higher with its liquid surface in the tank than the filling level sensor. For this reason, the filling level sensor should be disposed as low as possible in the tank. For this reason, it is appropriate if the additional sensor device is disposed above the filling level sensor. It is therefore possible to avoid the tight installation space at the bottom of the tank or of the conveying unit being blocked by the additional sensor device. It is then also possible to select a position at which ice can be detected reliably and/or early/relatively early, if appropriate in a way which is adapted to the freezing behavior of the additive in the tank.

In accordance with an added feature of the conveying unit of the invention, the additional sensor device or sensor has at least one electrical contact with which at least one of the following measurements can be carried out:
  a conductivity measurement of the liquid additive in the tank;
  a measurement of the electrical capacitance of the liquid additive in the tank; or
  a measurement of the electrical inductance of the liquid additive in the tank.

The described measurements each check the electrical properties of the additive in the region of the additional sensor device. These electrical properties can differ very greatly from one another depending on whether or not the liquid additive is frozen. In the frozen state the electrical conductivity of the liquid additive is also changed significantly because the molecules of the liquid additive are no longer freely mobile. For this reason, on the basis of a measurement of the conductivity it is possible to distinguish whether liquid additive or frozen additive is present. Likewise, the electrical capacitance and the electrical inductance of the additive differ significantly depending on whether it is present in a liquid phase or in a solid phase in the tank. Such an electrical sensor device can be embodied particularly cost-effectively and is therefore appropriate for carrying out the binary monitoring described further above with the sensor device.

In accordance with an additional advantageous feature of the conveying unit of the invention, the additional sensor device or sensor has at least one temperature sensor and a heater and is configured to carry out a measurement of the thermal capacity of the additive in the tank.

The temperature sensor and the (electric) heater are preferably disposed at a very short distance from one another in the sensor device. In order to determine the thermal capacity, the heater of the sensor device is operated briefly. The temperature sensor is used to monitor to what extent the temperature rises as a result of the operation of the adjacent heater. This rise in temperature (profile, speed, absolute values, etc.) differs greatly depending on whether liquid additive or frozen additive is present in the vicinity of the sensor device. This is due to the fact that the thermal capacity of the additive is different depending on whether it is in a frozen state or in a liquid state. If the thermal capacity is high, a relatively large amount of heating energy is required to ensure a specific rise in temperature at the temperature sensor. If the thermal capacity is low, a corresponding rise in temperature can already be achieved with low heating power. Such a sensor device is particularly cost-effective and reliable. In addition, with such a sensor device it is also possible to acquire more precise information about the state of the liquid additive which goes beyond merely detecting whether the additive is present in a liquid or frozen state.

In accordance with yet another advantageous feature of the conveying unit of the invention, the sensor device or sensor is suitable for emitting and receiving waves which are reflected back from frozen additive to the sensor device, with the result that by measuring the transit time of the waves it is possible to determine whether there is frozen additive in the tank.

Such a sensor device is preferably also an ultrasonic sensor which, in one particularly preferred embodiment variant, can be embodied precisely like the ultrasonic sensor which is also used to measure the filling level as a filling level sensor. This increases the number of components of identical construction within the conveying unit and therefore adds to a particularly cost-effective construction of the conveying unit. The sensor device can, for example, be conceived and configured in such a way that frozen additive which is present directly at a (lateral) tank wall brings about a reflection (for example approximately horizontal reflection) which is detected by the sensor device. If the additive is in the liquid state, such a reflection does not take place but instead the waves emitted by the sensor device only arrive very much later back at the sensor device because they are reflected, for example, at a wall of the tank. If such a sensor device (which can emit and receive waves) is used for this purpose in the conveying unit, it is advantageous if this sensor device is installed on the conveying unit in such a way that in the mounted state of the conveying unit on a tank it is oriented horizontally and therefore performs a horizontal measurement of the transit time of waves in the liquid additive. It is therefore possible to ensure that the filling level of liquid additive in the tank does not have a cross-influence in the measurement with the additional sensor device.

In accordance with yet a further advantageous feature of the conveying unit of the invention, the sensor device is a deflection route or path through the conveying unit to a measurement point for waves from the filling level sensor, wherein by measuring the transit time of waves which are reflected at the measurement point it is possible to determine whether there is frozen additive in the tank.

In this embodiment variant, the sensor device preferably does not have its own measuring unit but rather the filling level sensor is also used in parallel/simultaneously therewith in order to act as a sensor device and determine whether or not there is frozen additive in the tank. The filling level sensor is preferably conceived and configured to emit not only waves in the tank and therefore into the liquid additive in the tank and receive reflections of these waves but rather the filling level sensor also partially outputs waves within the conveying unit. In the conveying unit a deflection route or path is then provided, through which the waves are deflected/guided to the measurement point. The deflection route is preferably formed with a waveguide which directs the waves from the filling level sensor to the measurement point and/or by using at least one deflection device or deflector which deflects the waves within the conveying unit to the measurement point.

With the objects of the invention in view, there is also provided a tank for storing a liquid additive, the tank comprising a tank bottom on which the conveying unit according to the invention is disposed. Such a tank can be used for a motor vehicle, for example pre-assembled with the conveying unit and then used in a motor vehicle.

With the objects of the invention in view, there is furthermore provided a motor vehicle, comprising an internal combustion engine, an exhaust gas treatment device for purifying the exhaust gases of the internal combustion engine, a tank for storing a liquid additive and a conveying unit for conveying the liquid additive from the tank into the exhaust gas treatment device. This tank is preferably a tank for storing aqueous urea solution (or a corresponding reducing agent) for carrying out the SCR method in the exhaust gas treatment device, wherein the aqueous urea solution is metered into the exhaust gas treatment device and therefore into the exhaust gas, upstream of an SCR catalytic converter by using an injector. The motor vehicle preferably includes in this case a monitoring unit with which the data from the filling level sensor and the additional sensor device or sensor can be processed and which regulates the operation of the conveying unit and/or of the injector, wherein, if appropriate, characteristic values of the exhaust gas and/or of the internal combustion engine are also taken into account.

With the objects of the invention in view, there is concomitantly provided a method for determining a filling quantity of liquid additive in a tank, comprising at least the following steps:
- a) outputting a wave signal into the liquid additive in the tank with a filling level sensor and activating a timer;
- b) receiving at least one response signal to the wave signal with the filling level sensor and determining at least one transit time of the filling level signal, and
- c) calculating the filling quantity in the tank from the at least one transit time,
- i) using an additional sensor device or sensor to check if there is frozen additive in the tank if in step c) a filling quantity has been determined which is less than a predefined residual filling quantity, and
- ii) correcting the determined filling quantity if frozen additive has been determined in step i).

Measurement of the distance/transit time of the wave signal through the liquid additive from the filling level sensor to a surface of the liquid and back is carried out through the use of the method steps a) to c). The measurement of the distance is carried out by measuring the transit time taking into account the fact that the speed of the wave signal in the liquid additive is known (and, for example, can be retrieved from a monitoring unit). In addition to the measurement of the transit time carried out in the steps a) to c) in order to determine the filling level, a further measurement of the transit time can take place which determines, for example, the distance/transit time of a wave signal to a (different) reference mark and back to the filling level sensor in order to determine the propagation speed of the waves in the liquid additive (separately). This permits the measurement of the distance of the surface of the liquid from the filling level sensor to be carried out independently of the speed of the wave signal in the liquid additive which is measured (currently or simultaneously).

Furthermore there is provision for the additional sensor device or sensor to be used to monitor/check whether there is frozen additive or liquid additive in the tank. This is done in step i).

In order to correct the determined filling quantity in step ii) various additional parameters can be used if it has been detected in step d) that there is frozen liquid additive in the tank. For example, a previously determined filling level value, which was determined when there was definitely still liquid additive in the tank, can be read out of an electronic memory (the monitoring unit). Instead of the filling level value determined in step i) the filling level value present in the memory can then be used, with the filling level value permitting at least relatively precise (real time) estimation of the actual filling level in the tank. Furthermore, it is possible in step ii) for the filling quantity to be corrected to a minimum filling quantity which has to be present for frozen additive to be at all present at the sensor device. It was described above that the sensor device is preferably disposed above the filling level sensor. Therefore, only frozen additive can be detected with the sensor device if the surface of the liquid is above the sensor device. The measurement of frozen additive at the sensor device is therefore representative of a specific minimum residual quantity of additive in the tank.

The method steps i) and ii) can (at least partially) be carried out before or after the method steps a) to c). If the method steps i) and ii) are carried out first, according to one particularly advantageous embodiment variant of the method it is also possible to abort the method if it is detected that frozen liquid additive is present in the tank.

The described method can, in particular, be carried out with a conveying unit described further above which is then, in particular, configured and conceived to carry out the method. The particular advantages and configuration features presented for the described method can be applied and transferred in a corresponding way to the described conveying unit. The same applies to the particular advantages and configuration features presented for the described conveying unit which can be applied and transferred in a corresponding way to the described method.

Other features which are considered as characteristic for the invention are set forth in the appended claims, noting that the features which are disclosed individually in the claims can be combined with one another in any desired technically appropriate way and can be supplemented by contents from the description, wherein further embodiment variants of the invention are disclosed.

Although the invention is illustrated and described herein as embodied in a conveying unit for a liquid additive for exhaust gas after-treatment, a tank for storing a liquid additive, a motor vehicle having the conveying unit and a method for determining a liquid additive quantity in a tank, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
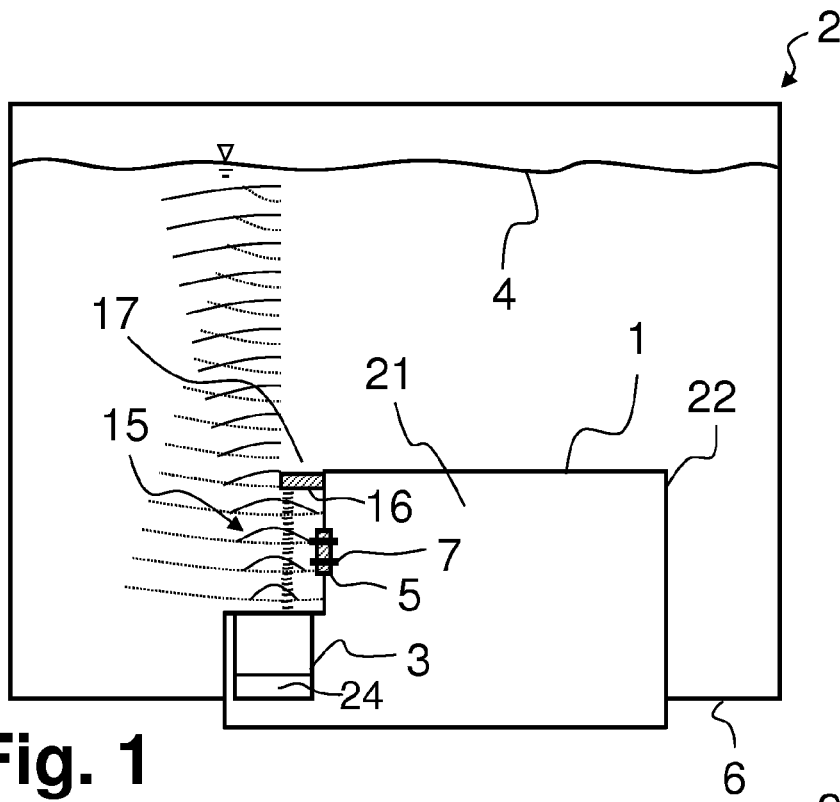
FIG. 1 is a vertical-sectional view of a tank with a first embodiment variant of a conveying unit.
Figure 2:
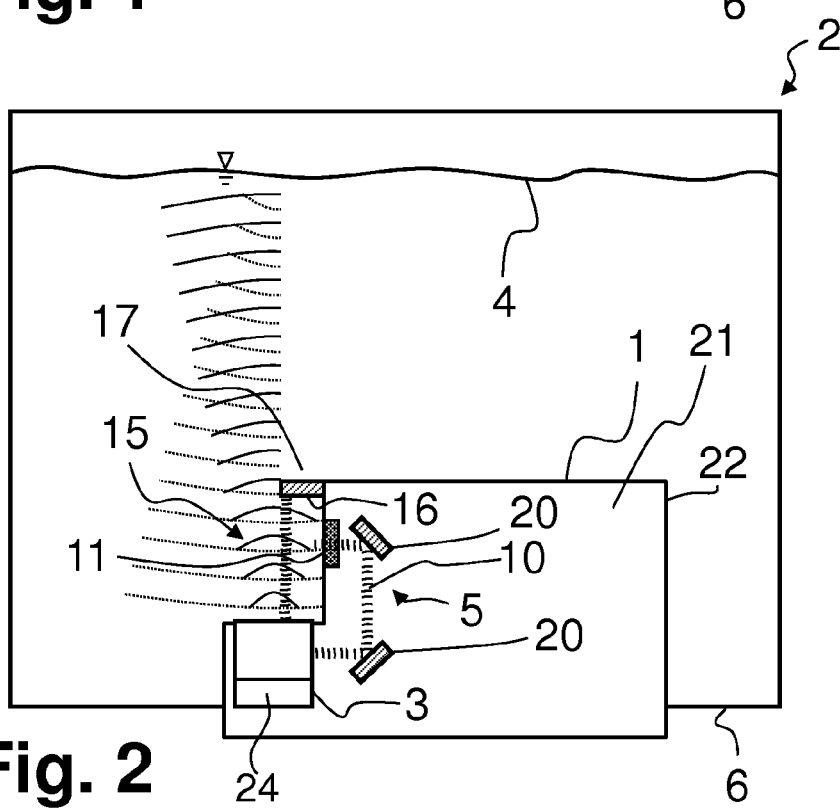
FIG. 2 is a vertical-sectional view of a tank with a second embodiment variant of a conveying unit.
Figure 3:
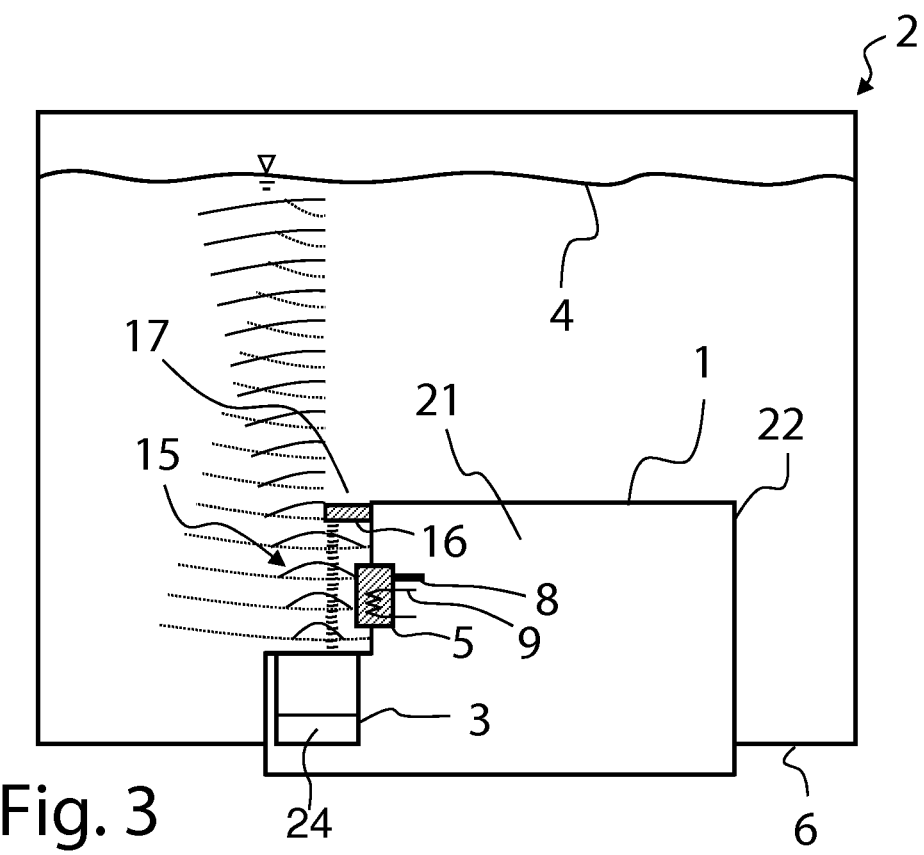
FIG. 3 is a vertical-sectional view of a tank with a third embodiment variant of a conveying unit.

Referring now in detail to the figures of the drawings, in which identical components have the same reference symbol even if they can be embodied differently in the specific configuration and in which the figures are initially explained partially jointly wherever a similar structure and/or similar components are illustrated, and first, particularly, to FIGS. 1, 2 and 3 thereof, it is seen that these figures each illustrate a tank 2 having a tank bottom 6 in which a conveying unit 1 is inserted. The conveying units 1 each have a filling level sensor 3 (in particular an ultrasonic sensor) with which the filling level of liquid additive (in particular aqueous urea solution) in the tank 2 can be determined. For this purpose, the filling level sensor 3 outputs waves into an irradiation region 15 and the waves are reflected by a surface 4 of the liquid additive in the tank 2 and sent back to the filling level sensor 3. It is therefore possible, by measuring the transit time of the waves (time period between the emission and reception of the waves) to the surface 4 of the liquid and back to the filling level sensor 3 to determine the filling level of liquid additive in the tank 2. The filling level sensor 3 is provided with a timer 24 for this purpose. The radiation region 15 can also be partially provided with a cover 17 which is disposed on a housing 22. It is therefore possible to limit the propagation of waves and/or to protect the filling level sensor 3. In this context the cover 17 is disposed, in particular, (partially) opposite the filling level sensor 3, preferably at the largest possible distance on the housing 22.

The housing 22 of the conveying unit 1 bounds an interior space 21 of the conveying unit 1. The filling level sensor 3 is disposed in this interior space 21. A reference mark 16, which extends into the radiation region 15 of the filling level sensor 3 and which also reflects a portion of the waves emitted by the filling level sensor 3 is, for example, provided on the conveying unit 1. As a result, a measurement of the transit time for the journey of the waves to the reference mark 16 and back to the filling level sensor 3 can be carried out. Through the use of this additional measurement of the transit time it is possible to correct the measurement of the transit time to the surface 4 of the liquid in order to eliminate cross-influences occurring as a result of the current properties of the liquid additive (such as, for example, the temperature or the composition).

An additional sensor device or additional sensor 5 with which it is possible to monitor/determine whether the additive present in the tank 2 is in the liquid state or in the solid (frozen) state, is provided on the conveying unit 1.

According to the embodiment variants in FIGS. 1, 2 and 3, the additional sensor device 5 is configured differently in each case, as explained below, without necessarily specifying only alternative embodiments herein.

According to FIG. 1 the sensor device 5 has an electrical contact 7 with which an electrical measurement (for example a measurement of the conductivity of the liquid additive, a measurement of the capacitance of the liquid additive and/or a measurement of the electrical inductance of the liquid additive) can be carried out.

According to FIG. 2, the sensor 5 is provided with a deflection path 10 inside the conveying unit 1. A portion of the waves emitted by the filling level sensor 3 can be deflected over the deflection path 10 to a measurement point 11. It is therefore possible to determine whether liquid additive or frozen additive is present by using the current conditions at the measurement point 11. A reflection of the waves takes place, or does not take place, at the measurement point 11, depending on whether or not the additive is frozen. If a reflection takes place, the waves are reflected back to the filling level sensor 3 over the deflection path 10. The deflection path 10 is provided with a deflection device or deflector 20 (such as a reflector or the like) which deflects the waves along the deflection path 10 within the conveying unit 1 or within the interior space 21 of the housing 22.

According to FIG. 3, the sensor device 5 is embodied with a temperature sensor 8 and a heater 9 which together can carry out a measurement of the thermal capacity of the additive in the tank.

Figure 4:
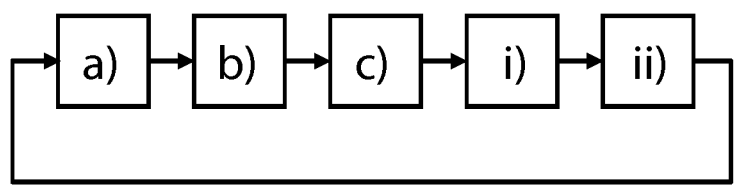
FIG. 4 is a flow chart of a method for determining a filling quantity in a tank.

FIG. 4 illustrates, for example, a flow chart of the described method for determining the filling quantity of liquid additive in the tank. It is possible to see the method steps a), b), c), i) and ii) which can be repeated iteratively in the manner of a loop in order to monitor the filling level in the tank regularly (at predefined intervals and/or according to requirements) and therefore be able to make available up-to-date information about the filling quantity of liquid additive in the tank.

Figure 5:
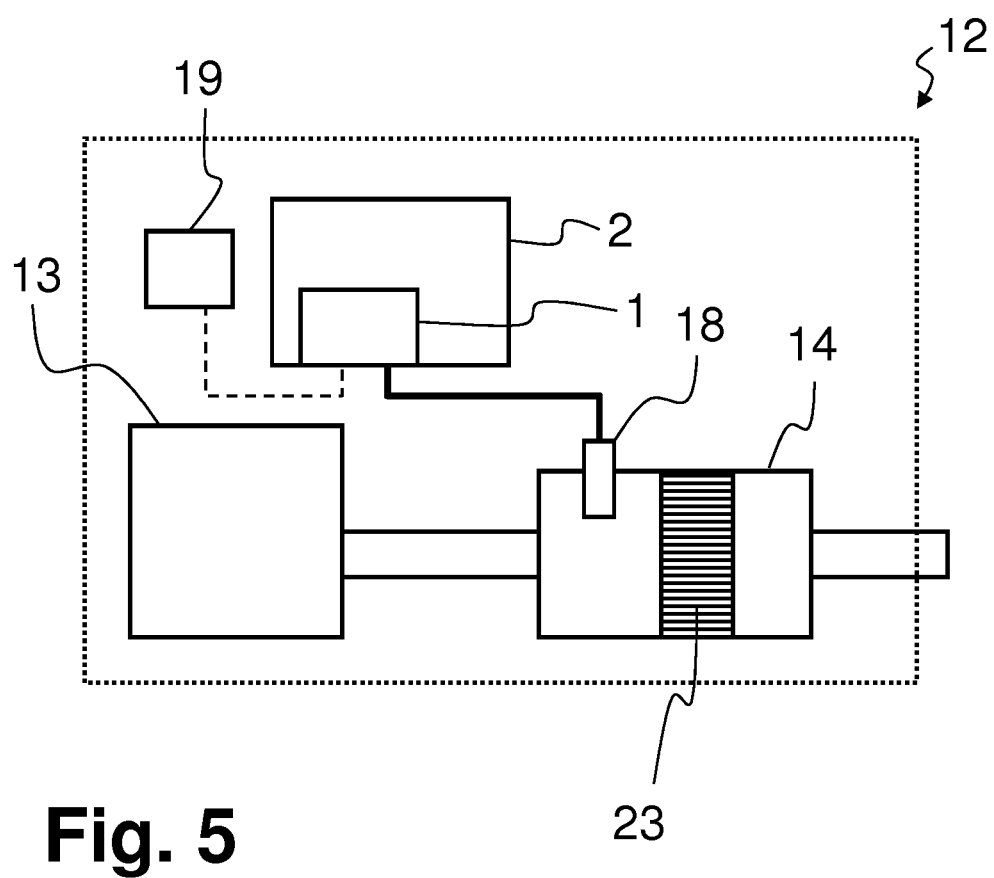
FIG. 5 is a block diagram of a motor vehicle.

FIG. 5 shows a motor vehicle 12 having an internal combustion engine 13 and an exhaust gas treatment device 14 for purifying the exhaust gases of the internal combustion engine 13. Liquid additive (aqueous urea solution) can be fed into the exhaust gas treatment device 14 with a feed device 18 (for example an injector which can be activated in a controlled fashion). An SCR catalytic converter 23, with which nitrogen oxide compounds in the exhaust gas of the internal combustion engine 13 can be reduced together with the liquid additive fed in through the feed device 18, is preferably provided in the exhaust gas treatment device 14. The feed device 18 is supplied with liquid additive from a tank 2 by using a conveying unit 1. A monitoring unit 19 which is additionally provided monitors a measurement of the filling level with the conveying unit 1 and, if appropriate, is configured to carry out the method described above for determining the filling quantity of liquid additive in the tank.

The invention claimed is:

1. A conveying unit configured to be mounted in a tank for conveying a liquid additive from the tank, the conveying unit comprising:
    a filling level sensor configured to emit waves and to receive waves reflected back to said filling level sensor at a surface of liquid in the tank, permitting a filling level measurement to be carried out by measuring a transit time of the waves;
    a reference mark extending into a radiation region of said filling level sensor, said reference mark reflecting a portion of the waves emitted by said filling level sensor back to said filling level sensor; and
    at least one additional sensor configured to determine a presence of frozen additive in the tank.

2. The conveying unit according to claim 1, wherein said filling level sensor is an ultrasonic sensor.

3. The conveying unit according to claim 1, wherein the conveying unit is configured to be mounted on a tank bottom of the tank, and said additional sensor is disposed further away from the tank bottom than said filling level sensor.

4. The conveying unit according to claim 1, wherein said at least one additional sensor has at least one electrical contact configured to carry out at least one of the following measurements:
    a conductivity measurement of the liquid additive in the tank;
    a measurement of an electrical capacitance of the liquid additive in the tank; or
    a measurement of an electrical inductance of the liquid additive in the tank.

5. The conveying unit according to claim 1, wherein said at least one additional sensor has at least one temperature sensor and a heater and is configured to carry out a measurement of a thermal capacity of the additive in the tank.

6. The conveying unit according to claim 1, wherein said at least one additional sensor is configured to emit waves and to receive waves reflected back from frozen additive to said at least one additional sensor, to determine if frozen additive is present in the tank by measuring a transit time of the waves.

7. A tank for storing a liquid additive, the tank comprising:
    a tank bottom; and
    a conveying unit according to claim 1 disposed on said tank bottom.

8. A motor vehicle, comprising:
an internal combustion engine;
an exhaust gas treatment device configured to purify exhaust gases of said internal combustion engine;
a tank configured to store a liquid additive; and
a conveying unit according to claim 1 configured to convey the liquid additive from said tank into said exhaust gas treatment device.

9. The conveying unit according to claim 1, wherein said reference mark provides an additional transit time from said mark to said filling level sensor for correcting the transit time of the waves to the surface for eliminating cross influences occurring as a result of current properties of the liquid additive.

10. A method for determining a filling quantity of liquid additive in a tank, the method comprising the following steps:
a) outputting a wave signal from a filling level sensor into the liquid additive in the tank and activating a timer;
b) receiving at least one response signal to the wave signal at the filling level sensor and determining at least one transit time of the filling level signal;
c) calculating the filling quantity in the tank from the at least one transit time;
i) using an additional sensor including a deflector deflecting a portion of the wave signal along a deflection path within an interior space of a housing of a conveying unit to a measurement point on the housing to check if frozen additive is present in the tank if the filling quantity calculated in step c) is less than a predefined residual filling quantity; and
ii) correcting the calculated filling quantity if frozen additive has been determined to be present in step i).

11. A conveying unit configured to be mounted in a tank for conveying a liquid additive from the tank, the conveying unit comprising:
a filling level sensor configured to emit waves and to receive waves reflected back to said filling level sensor at a surface of liquid in the tank, permitting a filling level measurement to be carried out by measuring a transit time of the waves;
at least one additional sensor configured to determine a presence of frozen additive in the tank; and
a measurement point for waves emitted from said filling level sensor, said at least one additional sensor being in a deflection path extending through the conveying unit to said measurement point, for determining a presence of frozen additive in the tank by measuring a transit time of the waves reflected at said measurement point.

12. The conveying unit according to claim 11, further comprising a deflector disposed in the deflection path, said deflector deflecting waves along the deflection path.

* * * * *